US008088996B2

(12) United States Patent
Törnkvist et al.

(10) Patent No.: US 8,088,996 B2
(45) Date of Patent: Jan. 3, 2012

(54) HIGH VOLTAGE DC BUSHING AND DEVICE COMPRISING SUCH HIGH VOLTAGE BUSHING

(75) Inventors: Christer Törnkvist, Strömsholm (SE); Uno Gäfvert, Västerås (SE)

(73) Assignee: ABB Research Ltd., Zürich (CH)

( * ) Notice: Subject to any disclaimer, the term of this patent is extended or adjusted under 35 U.S.C. 154(b) by 491 days.

(21) Appl. No.: 12/439,526

(22) PCT Filed: Aug. 30, 2007

(86) PCT No.: PCT/SE2007/050599

§ 371 (c)(1), (2), (4) Date: Feb. 28, 2009

(87) PCT Pub. No.: WO2008/027007

PCT Pub. Date: Mar. 6, 2008

(65) Prior Publication Data

US 2009/0266600 A1 Oct. 29, 2009

(30) Foreign Application Priority Data

Aug. 31, 2006 (SE) ...................................... 0601786

(51) Int. Cl.
*H02G 5/06* (2006.01)
*H02G 15/25* (2006.01)
*H01B 7/285* (2006.01)
*H01B 17/26* (2006.01)

(52) U.S. Cl. .................. 174/22 R; 174/21 R; 174/23 R; 174/137 R; 174/142; 174/143; 174/178; 174/195; 174/209

(58) Field of Classification Search ................ 174/21 R, 174/22 R, 23 R, 137 R, 140 C, 142, 143, 174/178, 179, 181, 189, 195, 196, 209
See application file for complete search history.

(56) References Cited

U.S. PATENT DOCUMENTS 1,585,124 A * 5/1926 Simons ........................ 174/21 R
1,905,691 A * 4/1933 Eby ............................. 174/21 R
2,053,163 A * 9/1936 Phillips ........................ 174/21 R
2,540,898 A * 2/1951 Macardier ................... 174/22 R
3,051,770 A * 8/1962 Palmieri ...................... 174/22 R
3,462,545 A * 8/1969 Grimmer ...................... 174/143
3,659,033 A 4/1972 Grimmer
4,227,035 A * 10/1980 Runnels et al. .............. 174/15.3

FOREIGN PATENT DOCUMENTS

EP 0429843 6/1991

OTHER PUBLICATIONS

International Search Report—Nov. 29, 2007.
Written Opinion of the International Searching Authority—Nov. 27, 2007.

* cited by examiner

*Primary Examiner* — Tran N. Nguyen
*Assistant Examiner* — Thomas Truong
(74) *Attorney, Agent, or Firm* — Venable LLP

(57) ABSTRACT

A high voltage DC bushing including a fluid duct with non-constant width (Δr) along the axial direction of the bushing.

9 Claims, 2 Drawing Sheets

HIGH VOLTAGE DC BUSHING AND DEVICE COMPRISING SUCH HIGH VOLTAGE BUSHING

CROSS-REFERENCE TO RELATED APPLICATIONS

This application claims priority to Swedish patent application 0601786-7 filed 31 Aug. 2006 and is the national phase under 35 U.S.C. §371 of PCT/SE2007/050599 filed 30 Aug. 2007.

FIELD OF INVENTION

The present invention relates generally to high voltage bushings and more particularly to a high voltage bushing having an improved internal DC voltage distribution. The invention also relates to a high voltage device comprising such high voltage bushing.

BACKGROUND

It is known that electrical equipment and devices, such as high voltage DC transformers, are usually equipped with bushings, which are suitable to carry current at high potential through a grounded barrier, e.g. a transformer tank or a wall. Conventional bushings are constituted by an insulator made of ceramic or composite material, which is provided with sheds and is generally hollow, and on the inside can the voltage grading be performed with or without a condenser body through which the electrical conductor passes, allowing to connect the inside of the device on which the bushing is fitted to the outside.

An example of a prior art bushing adapted for use with a high voltage do transformer will now be described with reference to FIGS. 1-3, wherein FIG. 1 shows the overall structure of the bushing, generally referenced 1, FIG. 2 is an overall cross-sectional view of the bushing mounted to a transformer housing, and FIG. 3 is a detailed sectional view of the area enclosed by the dashed line in FIG. 2.

A high voltage conductor 10 runs through the center of a hollow bushing insulator 12 that forms a housing around the high voltage conductor. A condenser core 14 is provided inside the insulator housing for voltage grading which is build up around the high voltage conductor 10. A flange 16 is provided to connect the housing of the bushing to ground through a tank assembly housing, schematically shown as 18 in FIG. 2. A ground potential grading shield (not shown) may be mounted to the flange.

The bottom end portion of the high voltage conductor 10 forms a bottom contact 20, which is arranged to be connected to the internal components of the transformer. An upper outer terminal 24 is provided at the end of the bushing opposite the bottom contact end in order to electrically connect the transformer device to external sources.

In high voltage DC applications, material resistivity becomes important. Materials surrounding the condenser core may become more essential for the voltage distribution than the condenser core itself. Oil with a relatively low resistivity and short time constant compared to the composite materials may become the most important part for voltage grading.

Turning now to FIG. 3, it is seen that an annular or cylindrical oil duct 26 having a constant width in a radial direction is provided between the condenser core 14 and a composite barrier 28. The oil duct has tapering end portions which follow the outer contour of the condenser core. The function of the oil duct is to act mainly as a flexible dielectric interface between the condenser core and the composite barrier.

The space 30 outside the composite barrier 28 is filled with insulating gas, such as SF6, to provide electrical isolation between the barrier and the hollow bushing insulator 12.

In a DC bushing, a voltage potential distribution is built up mainly in a radial direction from the grounded flange 16 and inwards to the high voltage conductor 10. However, along the tapering portions of the oil duct and the composite barrier, the voltage potential distribution also has an axial component. In the oil duct, this distribution is governed by the resistance of the oil in an axial direction. This resistance can be expressed as follows:

$$R/A,$$

wherein R is the resistivity of the oil and A is the total cross-sectional area of the oil duct. The area of the oil duct can be expressed as follows, using the parameters shown in FIG. 4:

$$A=\pi(\Delta R+2r_1\Delta r)$$

wherein $r_2$ is the outer radius of the oil duct, $r_1$ is the inner radius of the oil duct, and $\Delta r$ is $r_2-r_1$.

In the prior art bushing shown in FIG. 3, the width of the oil duct is constant, i.e., $\Delta r$ is a constant along the length of the bushing. In the tapering outer portions of the bushing, the outer and inner radiuses decrease in the direction of the end portions. This in turn means that the resistance per axial length unit increases in the direction of the end portions since the total area of the oil ducts decreases, given constant $\Delta r$.

SUMMARY OF THE INVENTION

An object of the present invention is to provide a high voltage bushing wherein the electrical stress inside the bushing can be controlled in a satisfying way. Another object is to provide a high voltage device comprising such a high voltage bushing.

The invention is based on the realization that by giving the oil duct in a high voltage DC bushing a non-constant width in a radial direction along the axial direction of the bushing, the oil duct can be designed so that the electrical voltage potential distribution will be controlled in a satisfying way.

According to a first aspect of the invention a high voltage bushing is provided a high voltage DC bushing comprising a housing being symmetrical about a center axis and comprising a grounding flange; a high voltage conductor provided in the housing; a condenser core provided around the high voltage conductor; a barrier layer provided in the housing; and a duct filled with fluid and provided between the barrier layer and the condenser core; the bushing being characterized in that the fluid duct has non-constant width along the axial direction of the bushing to achieve a desired voltage potential distribution in the bushing.

According to a second aspect of the invention a high voltage device is provided.

With the inventive bushing and device, advantages over prior art are obtained. The DC voltage distribution in the barrier material can be controlled in a satisfying way but also the distribution in the fluid duct itself.

In a preferred embodiment, the fluid duct is designed with a constant area along the axial direction of the bushing, resulting in an essential linear DC voltage distribution in the fluid duct.

In another preferred embodiment, the fluid duct is designed with an area distribution along the axial direction of the bushing, resulting in a voltage distribution similar to that of a corresponding high voltage AC bushing.

It is preferred that the fluid duct is an oil duct filled with oil.

BRIEF DESCRIPTION OF DRAWINGS

The invention is now described, by way of example, with reference to the accompanying drawings, in which.

DETAILED DESCRIPTION OF A PREFERRED EMBODIMENT

In the following a detailed description of a preferred embodiment of the present invention will be given. In this description, the term "high voltage" will be used for voltages of 50 kV and higher. Today, the upper limit in commercial high voltage devices is 800 kV but even higher voltages, such as 1000 kV or 1200 kV, are envisaged in the near future.

Figure 1:
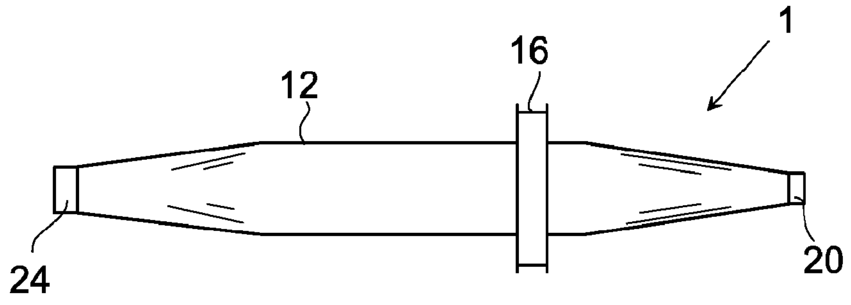
Fig. 1 (Prior art)
FIG. 1 is an overall view of a prior art high voltage bushing.
Figure 2:
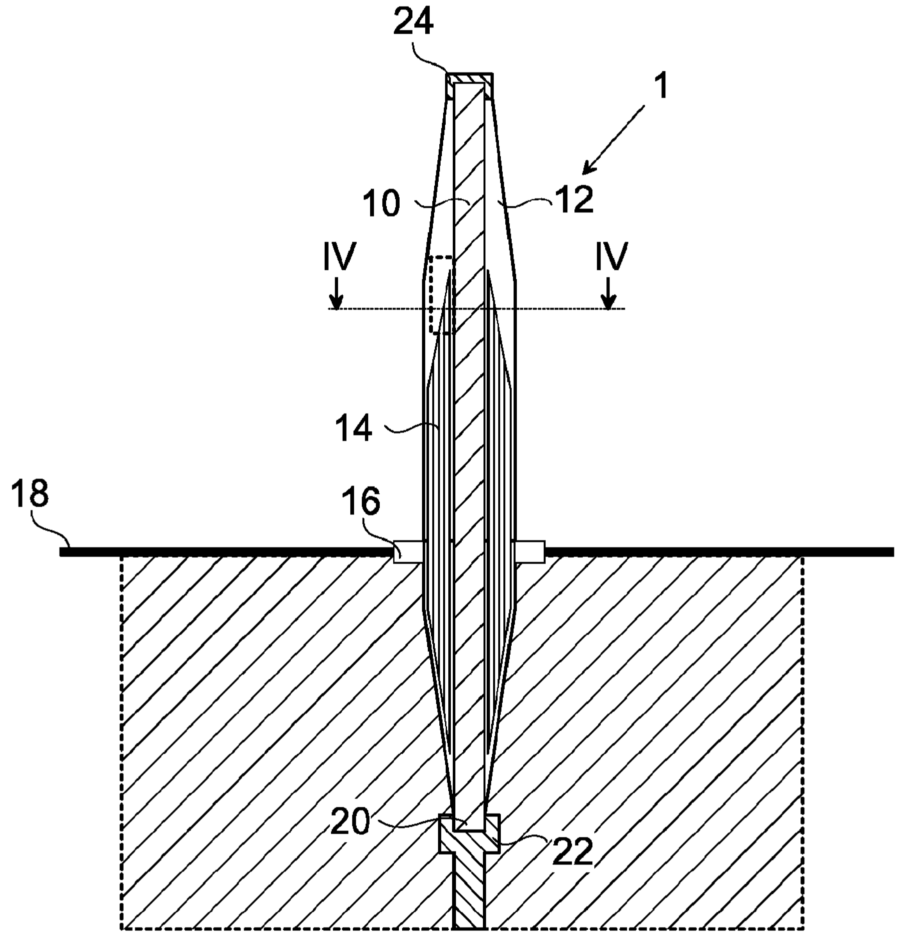
Fig. 2 (Prior art)
FIG. 2 is a sectional view of the bushing of FIG. 1 assembled to a transformer housing.
Figure 3:
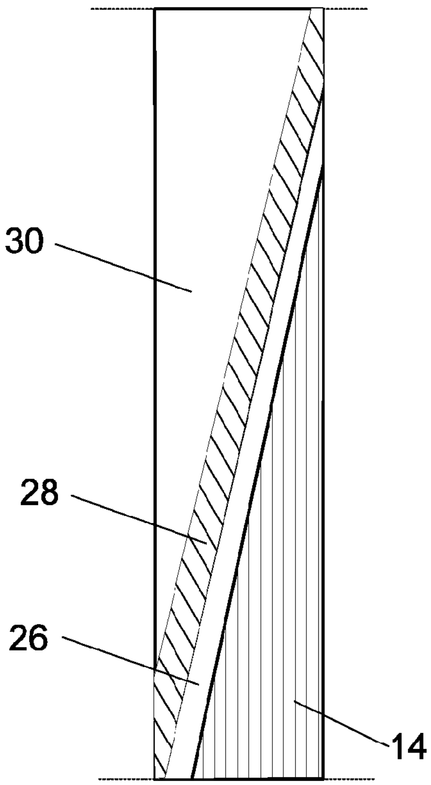
Fig. 3 (Prior Art)
FIG. 3 is a sectional enlarged view showing an oil duct and barrier layer in a high voltage DC bushing according to prior art.
Figure 4:
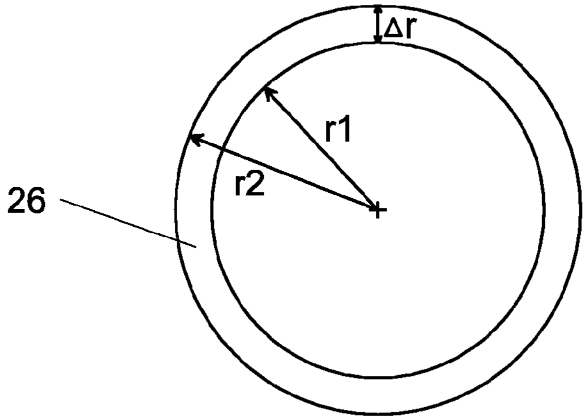
FIG. 4 is a cross-sectional view of the oil duct taken along the line IV-IV in FIG. 2.

The present invention is applicable to the general description of the high voltage DC bushing given in the background section with reference to FIGS. 1, 2, and 4 and reference will in the following be made to these figures.

Figure 5:
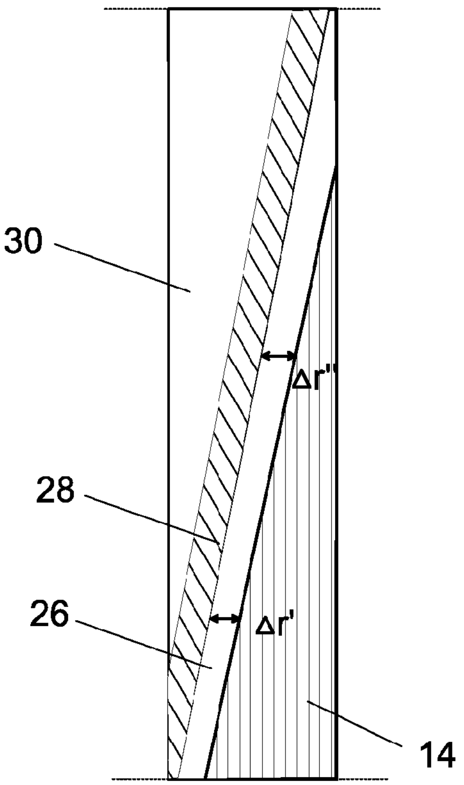
FIG. 5 is a sectional enlarged view similar to that of FIG. 3 but showing an oil duct and barrier layer in a high voltage DC bushing according to the invention.

Turning now to FIG. 5, showing a sectional view of part of a HVDC bushing according to the invention, it is seen that an annular fluid duct 26, preferably an oil duct filled with oil, is provided between the condenser core 14 and a composite barrier 28. The space outside the composite barrier 28 is filled with insulating gas.

From FIG. 5 it is seen that the width Δr of the oil duct 26 is not constant along the axial direction of the bushing. Instead, the width Δr increases with smaller radius of the oil duct, i.e., the oil duct is wider close to the end portions of the bushing. In other words, with reference to the references in FIG. 5, $$\Delta r' < \Delta r''.$$

In a preferred embodiment, the resistance per axial length unit of the oil in the oil duct is constant along the axial length of the bushing. This is the case if the inner and outer radiuses satisfy the following equation:

$$(\Delta r)^2 + 2r_1\Delta r = C,$$

wherein Δr is $r_2 - r_1$ and C is a constant.

Thus, by giving the oil duct non-constant width, the DC voltage distribution can be controlled so as to reduce voltage stress in the barrier layer 28 and also in the oil duct itself.

In another preferred embodiment, the oil duct is designed with a non-constant width along the axial direction of the bushing, which provides a cross-sectional area distribution along the axial direction of the bushing resulting in a voltage distribution similar to that of a corresponding high voltage AC bushing.

Thus, it has been shown that by giving the oil duct of a HVDC bushing a varying width, DC voltage distribution in the bushing can be controlled and DC stresses thereby reduced.

Although the high voltage device to which the inventive high voltage DC bushing is attached has been described as a transformer, it will be appreciated that this device can be other things, such as a reactor, breaker, generator, or other device finding an application in high voltage systems. In this regard, a wall should be considered a device in the sense of the invention.

Oil is in this application used as a preferred insulating fluid. However, a gel or other fluid with a resistivity lower than the surrounding composite are possible alternatives as insulating fluid.

The invention claimed is:

1. A high voltage DC bushing, comprising:

a housing being symmetrical about a center axis and comprising a grounding flange;

a high voltage conductor provided in the housing;

a condenser core provided around the high voltage conductor;

a barrier layer provided in the housing; and a fluid duct filled with fluid and provided between the barrier layer and the condenser core;

wherein the fluid duct has non-constant width (Δr) along an axial direction of the bushing to achieve a desired voltage potential distribution in the bushing.

2. The high voltage DC bushing according to claim 1, wherein the cross-sectional area of the fluid duct is essentially constant.

3. The high voltage DC bushing according to claim 2, wherein width variations of the fluid duct satisfy the following equation:

$$(\Delta r)^2 + 2r_1\Delta r = C,$$

wherein Δr is the width of the fluid duct, $r_1$ is an inner radius of the fluid duct and C is a constant.

4. The high voltage DC bushing according to claim 1, wherein the width (Δr) increases with smaller radius of the oil duct.

5. The high voltage DC bushing according to claim 1, wherein the fluid duct has tapering end portions.

6. The high voltage DC bushing according to claim 1, wherein the width of the fluid duct is wider close to end portions of the bushing.

7. The high voltage DC bushing according to claim 1, wherein the width (Δr) variations along the axial direction of the bushing results in a voltage distribution similar to that of a corresponding high voltage AC bushing.

8. The high voltage DC bushing according to claim 1, wherein the fluid duct is an oil duct filled with oil.

9. A high voltage DC device, comprising:

a high voltage DC bushing comprising a housing being symmetrical about a center axis and comprising a grounding flange, a high voltage conductor provided in the housing, a condenser core provided around the high voltage conductor, a barrier layer provided in the housing, and a fluid duct filled with fluid and provided between the barrier layer and the condenser core, wherein the fluid duct has non-constant width (Δr) along an axial direction of the bushing to achieve a desired voltage potential distribution in the bushing.

* * * * *